(12) United States Patent
Hawkins et al.

(10) Patent No.: US 7,457,849 B2
(45) Date of Patent: Nov. 25, 2008

(54) CONTROLLED FIREWALL PENETRATION FOR MANAGEMENT OF DISCRETE DEVICES

(75) Inventors: Darryl Hawkins, Lake Forest, CA (US); John Morrison, Fountain Valley, CA (US); Steven Sun, Irvine, CA (US)

(73) Assignee: Printronix, Inc., Irvine, CA (US)

( * ) Notice: Subject to any disclaimer, the term of this patent is extended or adjusted under 35 U.S.C. 154(b) by 670 days.

(21) Appl. No.: 10/863,605

(22) Filed: Jun. 8, 2004

(65) Prior Publication Data
US 2005/0273846 A1 Dec. 8, 2005

(51) Int. Cl.
*G06F 15/16* (2006.01)
*G06F 15/173* (2006.01)
(52) U.S. Cl. .................... 709/217; 726/11; 709/244
(58) Field of Classification Search .................... 726/11
See application file for complete search history.

(56) References Cited

U.S. PATENT DOCUMENTS

| | | | |
|---|---|---|---|
| 6,088,796 A * | 7/2000 | Cianfrocca et al. ........ | 713/152 |
| 6,119,228 A * | 9/2000 | Angelo et al. ............ | 713/180 |
| 6,233,688 B1 * | 5/2001 | Montenegro ............. | 726/11 |
| 6,308,205 B1 * | 10/2001 | Carcerano et al. ........ | 709/221 |
| 6,477,667 B1 * | 11/2002 | Levi et al. ............... | 714/57 |
| 6,553,422 B1 * | 4/2003 | Nelson .................... | 709/227 |
| 6,658,585 B1 * | 12/2003 | Levi ........................ | 714/4 |
| 6,658,586 B1 * | 12/2003 | Levi ........................ | 714/4 |
| 6,920,492 B2 * | 7/2005 | Richard ................... | 709/220 |
| 6,952,731 B2 * | 10/2005 | Picca et al. ............. | 709/225 |
| 6,978,383 B2 * | 12/2005 | Boyle et al. ............. | 726/15 |
| 2002/0013807 A1 * | 1/2002 | Richard ................... | 709/202 |
| 2005/0162689 A1 * | 7/2005 | Roztocil ................. | 358/1.15 |
| 2005/0285714 A1 * | 12/2005 | Hirose et al. ............ | 340/3.54 |

* cited by examiner

*Primary Examiner*—Christian LaForgia
(74) *Attorney, Agent, or Firm*—Jonathan W. Hallman; MacPherson Kwok Chen & Heid LLP

(57) ABSTRACT

A method of remotely controlling a client device is provided within a network having a network server coupled to a first side of a firewall from a web server coupled to a second side of the firewall. The network server initiates a service request for the client device through the transmission of an HTTP request through a conventional TCP/IP socket in the firewall to the web server. The web server dynamically alters content that in turn may be accessed by a user, which may either be a human user or an automated user. In response to downloading the altered content, the user transmits an HTTP request to the web server, which causes the web server to alter content that may then be downloaded by the network server. The network server interprets this altered content so as to control the device accordingly.

12 Claims, 3 Drawing Sheets

CONTROLLED FIREWALL PENETRATION FOR MANAGEMENT OF DISCRETE DEVICES

FIELD OF INVENTION

The present invention relates generally to computer network applications. More particularly, the present invention relates to the control of devices across a firewall.

BACKGROUND

Firewalls are typically used to control access from outside users on the Internet to networks such as local area networks or intranets. A firewall monitors traffic between the Internet and the protected network to prevent unauthorized entry by hackers or other malicious users. In lieu of a firewall, each host on the protected network would have to guard against such entry. Because only one host with a poorly-chosen password would jeopardize the entire network in such a case, a firewall provides a centralized security solution that alleviates policing by each host.

Network firewalls provide security in a number of fashions. For example, in a packet-filtering scheme, incoming and outgoing packets may be inspected so that non-conforming packets may be removed. Alternatively, a proxy server may be used to prevent any direct connections between hosts on the protected network and outside users on the Internet.

Regardless of the manner in which a firewall provides security to the protected network, situations arise in which outside users must communicate with devices or hosts within the protected network. For example, users may desire support of their networked devices by the device manufacturer. To gain electronic access to these devices, the manufacturer must cross the network firewall. For example, a port may be maintained in the firewall such as that provided for in a virtual private network (VPN) to allow outside users to penetrate the firewall. But maintaining such a port, even under the security of a VPN, allows a determined and sophisticated outsider means of accessing the protected network.

Accordingly, there is a need in the art for improved firewall penetration techniques that do not require a dedicated open port in the firewall.

SUMMARY

In accordance with one aspect of the invention, a method of managing devices within a network having a device server coupled to a first side of a firewall from a web server coupled to a second side of the firewall is provided. The method includes the acts of: issuing an HTTP request from the device server to a URL served by the web server to indicate that a device seeks service; changing content at a URL served by the web server in response to the indication that a device seeks service; issuing an HTTP request from a user's web browser to download the changed content indicating that service is requested; issuing an HTTP request from the user's web browser to indicate a command to the device; changing content at a URL served by the web server in response to the HTTP request indicating the command; issuing an HTTP request from the device server to download the changed content indicating the command to the device; interpreting the changed content indicating the command to the device; and commanding the device accordingly.

In accordance with another aspect of the invention, a method of managing devices within a firewall-protected network having a device server is provided. The method includes the acts of: changing content at a URL served by a web server in response to an HTTP request from the device server indicating that a device within the firewall-protected network requires service; and changing content at a URL served by the web server to indicate that a user has responded to the indication that the device requires service.

In accordance with another aspect of the invention, a web server is provided that is configured to perform the acts of: changing content at a URL served by the web server in response to an HTTP request from a device server indicating that a device seeks service; and changing content at a URL served by the web server in response to an HTTP request from a user's web browser indicating a command to the device; whereby if the device server downloads the changed content indicating the command to the device, the changed content is interpreted so that the device is commanded accordingly

DETAILED DESCRIPTION

Figure 1:
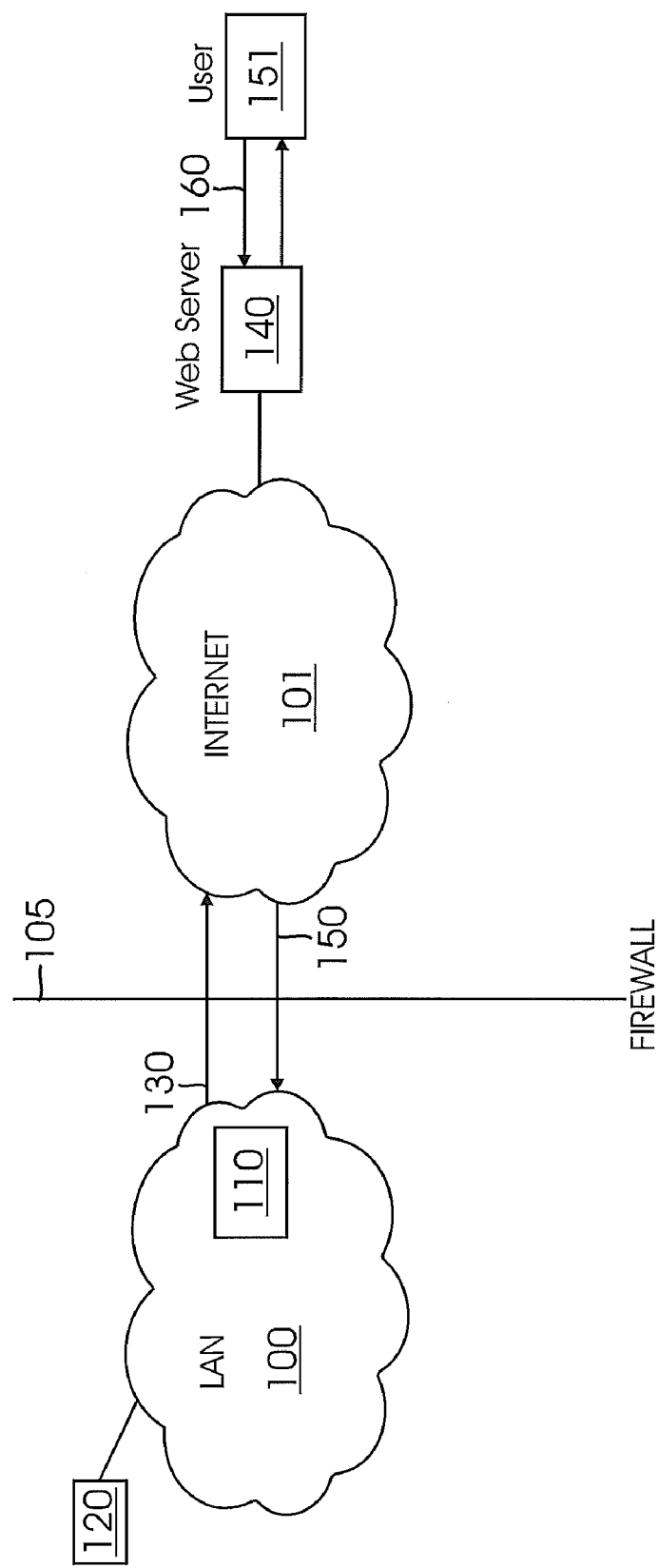
FIG. 1 is a block diagram of a system configured to implement the remote control of devices according to one embodiment of the invention.

As discussed previously, firewalls may implemented in a number of ways such as through packet filtering or proxy servers. Regardless of how a firewall is implemented, it will typically support TCP/IP sockets so that users may browse the Internet. To obviate the inherent risk of providing a dedicated port to outside users, the present invention exploits the availability of these TCP/IP sockets by enabling the remote control and configuration of devices protected by a firewall through a TCP/IP socket. Turning now to the drawings, an exemplary local area network (LAN) 100 coupled to the Internet 101 through a firewall 105 is shown in FIG. 1. In this embodiment, firewall 105 is implemented using a LAN server/router 110. However, it will be appreciated that the remote control and configuration of firewall-protected devices as disclosed herein may be practiced with respect to any firewall that supports conventional TCP/IP sockets. Moreover, the present invention may be implemented for any network protected by a firewall.

LAN server (which also operates as a router) 110 functions as a type of "one-way" valve in that hypertext transfer protocol (HTTP) requests are transmitted only from the LAN 100 to the Internet. LAN server 110 blocks HTTP requests that originate from the Internet and are sent to devices within LAN 100. In this fashion, a "hacker" cannot browse webpages on URLs (Uniform Resource Locations) within LAN 100 and alter or destroy their contents. However, users on LAN 100 may still browse external webpages or "web-surf" in the ordinary fashion. As known in the art, HTTP operates through the exchange of messages over a TCP/IP socket. A client device 120 within LAN 100, initiates the opening of a TCP/IP socket through which it may send an HTTP request 130 through router 110 to a web server 140 on the Internet that is configured to listen to messages from this TCP/IP socket. In turn, the web server 140 may respond with an HTTP response 150 to the client device 120. Any HTTP request such as request 130 takes the form of a number of different request methods, which are commands to the web server 140. For example, one method is denoted as a GET request, which is the basic method to retrieve content at a requested URL. Another form is denoted as a POST request, which uploads data such as that involved with the filling of Hypertext Markup Language (HTML) forms. In response to a GET request, web server 140 encodes the results of the request as a Multipurpose Internet Mail Extensions (MIME)-encapsulated document, which is returned through the TCP/IP socket as HTTP response 150.

It will be appreciated that the client/server exchange described so far with respect to HTTP request 130 from client device 120 and the corresponding HTTP response 150 from web server 140 is well known and widely practiced. However, in the present invention, this client/server exchange is exploited to allow a remote user 151 external to firewall 105 to manage and control client device 120. To provide this capability, web server 140 is configured to dynamically change the content stored at the URL accessed by the HTTP requests 130 coming from client device 120. For example, web server 140 may receive an HTTP request 130 indicating that the client device 120 is seeking service from user 151. This service request can take any number of forms. For example, client device 120 may simply be checking if updated software downloads are available. Alternatively, client device 120 may be malfunctioning such that the service request is seeking diagnosis and repair from user 150, Regardless of the particular type of service request being generated, web server 140 then dynamically changes the content at the corresponding URL or at another URL to denote the fact that client device 120 seeks service and the type of service being sought.

User 151 periodically issues its own HTTP requests 160 to the URL whose content was changed to check whether client device 120 is seeking service. In response to HTTP requests 160, web server 140 dynamically changes the content stored at the URL being accessed by subsequent HTTP requests 130 from client device 120. In this fashion, client device 120 may first access its URL to request service and then periodically check this URL or alternative URLs to see if user 151 has responded. This response by user 151 will be a dynamic change in content at the URL being checked by LAN server 110. Server 110 is configured to interpret this changed content to perform a desired action upon client device 120 such as returning an HTTP request 130 that contains information about the state of client device 120 to web server 140.

Figure 2:
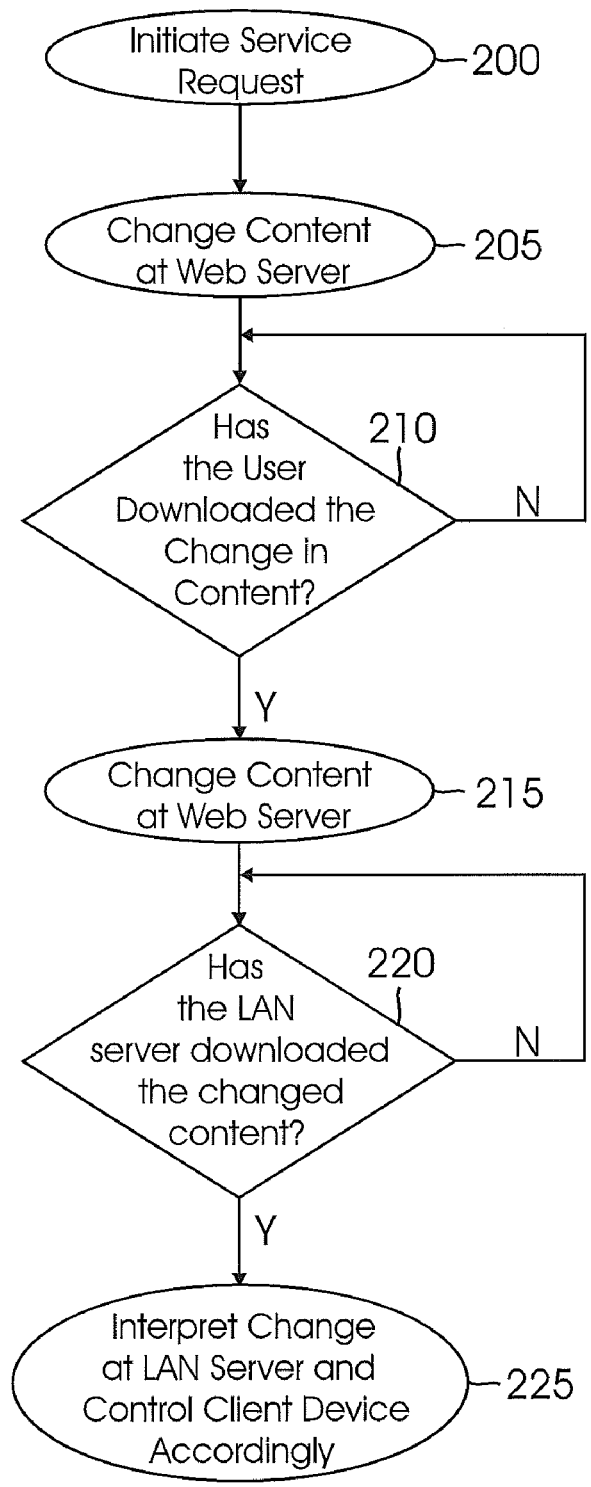
FIG. 2 is a flowchart illustrating the remote control method of devices in accordance with an embodiment of the invention.

This remote control and configuration process of client device 120 may be summarized with respect to the flowchart shown in FIG. 2. At step 200, LAN server 110 sends HTTP request 130 to web server 140 indicating that client device 120 seeks service. In response to this service request, web server 140 changes the content at the appropriate URL at step 205. The user must now read this changed content by issuing an HTTP request 160 to the appropriate URL to download the change in content at step 210. Having read the downloaded content indicating that a service request is pending, the user may issue an HTTP request 160 to web server 140 so as to change content at the appropriate URL at step 215. At step 220, LAN server 110 issues an HTTP request 130 to download the content changed by the user. At step 225, LAN server 110 interprets the downloaded content and controls client device 120 accordingly.

Note the advantage of this technique for remote control of client device120—no portal through firewall 105 such as a VPN portal need be maintained to allow HTTP requests to flow from user 151 to LAN server 110. Instead, both user 151 and LAN server 110 merely download content from appropriate URLs served by web server 140. In this fashion, data traffic between client device 120 and user 151 is no different than that would occur if a user within LAN 100 were web-browsing. Once client device 120 has been controlled appropriately, the TCP/IP socket supporting this data traffic may be shut down, thereby eliminating any potential security threat. Moreover, the threat posed by the data traffic between client device 120 and user 151 is limited in scope because the data traffic occurs through web server 140, which will be a known server to LAN server 110. As another security measure, LAN server 110 may be configured to alert the system administrator before initiating the service request such that the system administrator may then stop the communication between client device 120 and user 151 at any time.

Figure 3:
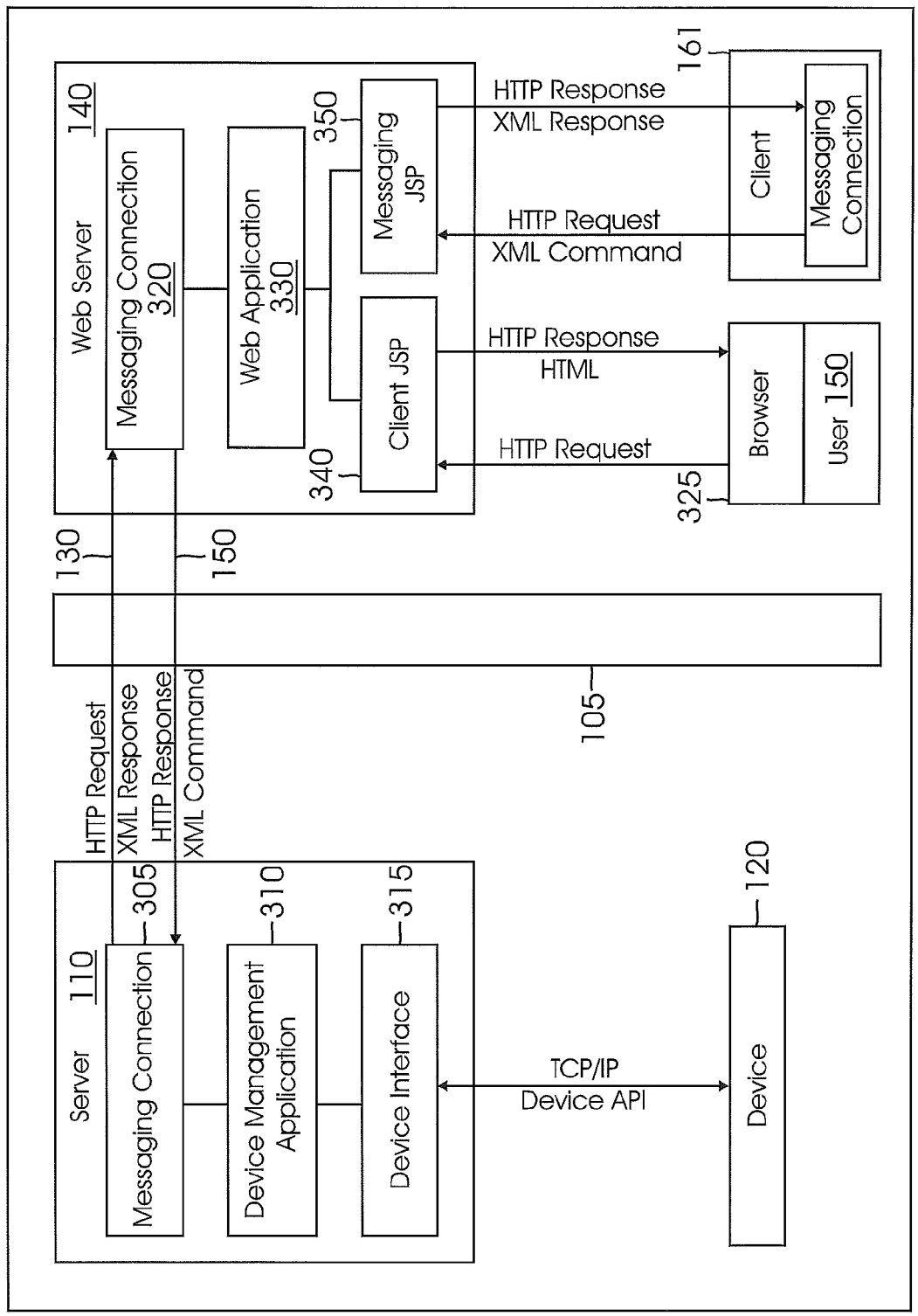
FIG. 3 is a block diagram of a system configured to implement the remote control of devices in accordance with an embodiment of the invention.

Those of ordinary skill in the art will appreciate that the above-described technique for remotely controlling devices through a firewall may be implemented in a number of fashions. Turning now to FIG. 3, a JAVA™-Server-Page-based (JSP-based) embodiment is illustrated. As described with respect to FIG. 1, a LAN server 110 couples a client device 120 to a web server 140 through a firewall 105. For illustration clarity, neither LAN 100 nor the Internet 101 is illustrated. Firewall 105 is shown for symbolic purposes since it is implemented by the filtering provided by LAN server 110, which blocks incoming HTTP requests from external devices. However, LAN server 110 does support ordinary web-browsing using an Internet messaging support application 305 that will access a TCP/IP socket to allow outgoing HTTP requests 130 and incoming HTTP responses 150 as discussed with respect to FIG. 1. The incoming HTTP responses allow LAN server 110 to download the changed content from web server 140. Although this changed content could be expressed as HTML should the URL(s) being accessed by LAN server 110 constitute ordinary webpages, HTML uses only predefined tags to describe the contents of its webpages. However, Extensible Markup Language (XML) allows custom tags to be developed to better express the commands to be issued to client device 120 as well as the information sought by user 151. Accordingly, HTTP responses 150 using XML provide a well-defined structure to pass commands to LAN server 110. Similarly HTTP requests 130 using XML also provide a well-defined structure to pass data responding to these commands to web server 140. However, it will be appreciated that other types of Standard Generalized Markup Language (SGML) may be used to define the formats of HTTP requests 130 and HTTP responses 150.

Regardless of the particular format being used to construct HTTP requests 130 and HTTP responses 150, LAN server 110 includes a device management application 310 configured to interpret the HTTP responses into the appropriate commands to client device 120. Similarly, device management application 310 is configured to interpret the data coming from client device 120 in response to these commands into the particular format being used for HTTP responses 150. An application program interface (API) 315 coordinates the linkage between client device 120 and server 110. The communication between device 120 and server 110 may be TCP/IP-based or implemented using any other suitable format, including a serial link such as an RS-232 link.

Web server 140 includes a messaging connection application 320 analogously to application 305 for LAN server 110. To provide security, a web application 330 may be included to handle any desired authentication of LAN server 110 and user 151. As discussed previously, web server 140 is configured to dynamically alter content stored at URL(s) in response to HTTP requests from both user 151 and LAN server 110. This dynamic control of content may be implemented in a number of ways such as through Active Server Pages or JAVA™ Server Pages. In the embodiment illustrated in FIG. 3, web server user 151 performs the dynamic control of content using Java Server Pages (JSPs). Java Server Pages may be used as a client JSP 340 to interact with uses a human user 151 through a web browser 325. Alternatively, a human user need not be involved to remotely control client device 120. For example, an automated client 161 may communicate with a messaging JSP 350 to remotely control client device 120.

As discussed above, XML provides a convenient format for the HTTP requests used to transmit commands and command responses to web server 140. It may be observed that web server 140 provides a type of messaging service between device 120 and user 151. For example, a service request may be transmitted from server 110 to web server 140 in the form of XML-encoded HTTP requests. No direct communication is made to user 151. Instead, user 151 may initiate the transmission of XML-encoded HTTP requests to web server 140 to check whether a device seeks service. Should content have been altered at. the URL being interrogated by these HTTP requests to indicate that a service request is pending, user 151 may respond with further XML-encoded HTTP requests to command device 120 as necessary. But these commands can only be posted as altered content at a URL by web server 140—web server 140 cannot issue an HTTP request to server 110 because of firewall 105. Thus, after posting a service request, server 110 must periodically check one or more URLs served by web server 140 so that the commands from user 150 may be downloaded.

The following XML-encoded HTTP requests represents an exemplary embodiment of commands that may be used to invoke JSP files stored in a JSP servlet engine (not illustrated) associated with web server 140. These commands should be distinguished from the commands that are downloaded to control or configure device 120. Rather than configure device 120, the following command set invokes responses from the JSP servlet engine.

Both server 110 and user 151 should be authenticated by web server 140 as being authorized users. In this fashion, a "hacker" is prevented from responding to or invoking service requests. To do so, both web browser 325 and server 110 are configured to issue an XML-encoded AUTHENTICATE command to web server 140. Upon authentication by web server 140, a session ID is created for subsequent access. The session ID may then be used with subsequent commands during the life of the session. The authenticate command may pass as parameters a user ID to identify the sender and the sender's password. The web server 140 may respond with a status code indicating whether authentication was successful and also the session ID.

Having been authenticated, server 110 may then issue an OPEN_SERVICE_REQUEST command to indicate that a device such as device 120 requires service. This service request is assigned a service ID that allows for virtual connections to server 110. Parameters of this command may include server's 110 session ID, an identification of device 120, an access list identifying devices to which the connection will allow access, a description of the desired service, the maximum number of connections that can be created for the service, and a connection password required to create a connection with the service. The web server 140 may respond with a status code indicating whether the service request was successful and also a service request ID that will be used to access this service request.

Having been authenticated, user 151 may check whether there are open service request through the issuance of a LIST_SERVICE_REQUESTS command to web server 140. This command includes as a parameter the user's session ID. In response, web server 140 provides a status code to indicate whether the request was successful and a list of all open service request identifying the service request ID, device, and the description of the desired service.

Having identified the open service requests, user 140 may respond to a particular request through the issuance of a CONNECTION_REQUEST command. Parameters for this command include the user's session ID, the ID of the service request being responded to, and a service request password. Web server 140 may respond with a status code to indicate whether the connection request was successful and a connection ID for use in sending and receiving messages.

Server 110 may then respond to the connection request command by issuing a NEW_CONNECTION command to complete the connection with user 151. This command includes as parameters the user's session ID. Web server 140 responds with a status code to indicate whether the connection completion request was successful, the ID of the service request being responded to, and the connection ID for use in sending and receiving messages.

Having established a connection between device 120 and user 151, web browser 325 and server 110 may begin to issue SEND_AND_RECEIVE commands to send outgoing messages and receive incoming messages. This command includes as parameters the session ID, the connection ID, and the outgoing message. It Will be appreciated that, because these commands all take the form of HTTP requests, an HTTP POST response may be used as necessary to include the outgoing message (which will typically either be a command for device 120 or a response to this command). Web server 140 may respond with a status code to indicate whether the send and receive command was successful and the incoming message.

To provide added security, server 110 may issue a CLOSE_SERVICE_REQUEST command so that no new connections may be made (note that multiple users may respond to a service request). Parameters for this command include the session ID and the service request ID. Web server 140 may respond with a status code indicating whether the command was successful.

Either server 110 or web browser 325 may close a connection by issuing a CLOSE_CONNECTION command to web server 140. This command includes as parameters the session ID and the connection ID. Web server 140 may respond with a status code to indicate whether the command was successful.

It will be appreciated that this command set is merely exemplary. Accordingly, although the invention has been described with respect to particular embodiments, this description is only an example of the invention's application and should not be taken as a limitation. Consequently, the scope of the invention is set forth in the following claims.

What is claimed is:

1. A method of managing devices within a network having a device server coupled to a first side of a firewall from a web server coupled to a second side of the firewall, the web server also serving a user's web browser that is not within the network, comprising:

issuing an HTTP request from the device server to a URL served by the web server to indicate that a device seeks service;

changing content at a URL served by the web server in response to the indication that a device seeks service;

issuing an HTTP request from the user's web browser to download the changed content indicating that service is requested;

issuing an HTTP request from the user's web browser to indicate a command to the device;

changing content at a URL served by the web server in response to the HTTP request indicating the command;

issuing an HTTP request from the device server to download the changed content indicating the command to the device;

interpreting the changed content indicating the command to the device; and commanding the device accordingly, whereby the device server downloads the changed content indicating the command to the device without receiving an HTTP request from the user's web browser.

2. The method of claim 1, further comprising:

authenticating the device server, wherein the act of changing content at the URL served by the web server in response to the indication that the device seeks service is performed only after authentication of the device server has been completed.

3. The method of claim 2, further comprising:

authenticating the user, wherein the act of changing content at the URL served by the web server in response to the HTTP request indicating the command is performed only after authentication of the user has been completed.

4. The method of claim 1, wherein the HTTP requests from the device server are XML-encoded HTTP requests.

5. The method of claim 1, wherein the HTTP request from the user's web browser is an XML-encoded HTTP request.

6. The method of claim 3, further comprising:

issuing an HTTP request from the user's web browser to the web server to identify a service request being responded to and to receive an identifier for communication with the device issuing the service request; and issuing an HTTP request from the device server to receive the identifier for communication, wherein the acts of issuing the HTTP request from the user's web browser to indicate the command to the device and issuing the HTTP request from the device server to download the changed content indicating the command to the device both supply the communication identifier to the web server, the web server responding only if the communication identifier is correctly supplied.

7. The method of claim 6, further comprising:

issuing an HTTP request from the device server to indicate that the web server should not respond to subsequent HTTP requests from the user's web browser, thereby preventing any further commands to the device from the user.

8. The method of claim 6, further comprising:

in response to the command, issuing an HTTP request from the device server to provide data from the device to the user.

9. A method of managing devices within a firewall-protected network having a device server, comprising:

changing content at a URL served by a web server in response to an HTTP request from the device server indicating that a device within the firewall-protected network requires service;

changing content at a URL served by the web server to indicate that a user has responded to the indication that the device requires service;

at the user server, downloading the changed content indicating that a user has responded to the indication that the device requires service;

at the user server, interpreting the changed content indicating that a user has responded to the indication that the device requires service to form a command for the device; and commanding the device responsive to the command, whereby the user server downloads the changed content without receiving an HTTP request at the user server.

10. The method of claim 9, further comprising:

responsive to the command, transmitting an HTTP request containing data describing a condition of the device to the web server.

11. The method of claim 10, further comprising:

changing content at a URL served by the web server in response to an HTTP request from the device server containing data describing a condition of the device.

12. The method of claim 11, further comprising:

downloading to the user the changed content responsive to the HTTP request from the device server containing data describing the condition of the device.

* * * * *